United States Patent [19]
Petrzik et al.

[11] Patent Number: 6,079,206
[45] Date of Patent: Jun. 27, 2000

[54] HYDRAULIC SYSTEM AND A METHOD FOR DEGASSING SAME

[75] Inventors: Gunther Petrzik, St. Georgen; Hartmut Hohensee, Unterschleissheim; Martin Seufert, Leonberg, all of Germany

[73] Assignees: Getrag Getriebe- Und Zahnradfbrik Hermann Hagenmeyer GmbH & Cie; Bayerische Motorenwerke AG, both of Munich, Germany

[21] Appl. No.: 08/889,410

[22] Filed: Jul. 8, 1997

[30] Foreign Application Priority Data

Jul. 11, 1996 [DE] Germany .................... 196 27 974

[51] Int. Cl.[7] .................................................. F16D 31/02
[52] U.S. Cl. ................................ 60/453; 91/431; 91/437
[58] Field of Search ........................... 60/453; 91/431, 91/437

[56] References Cited

U.S. PATENT DOCUMENTS

| | | |
|---|---|---|
| 2,552,634 | 2/1951 | Kerr ........................................... 91/431 |
| 4,002,105 | 1/1977 | Bell et al. ..................................... 92/62 |
| 4,385,909 | 5/1983 | Starr . | |
| 4,779,418 | 10/1988 | Artzberger . | |
| 5,072,584 | 12/1991 | Mauch et al. .............................. 91/437 |
| 5,669,280 | 9/1997 | Niiyama et al. ........................... 91/431 |
| 5,682,743 | 11/1997 | Kent ........................................... 91/431 |

FOREIGN PATENT DOCUMENTS

| | | |
|---|---|---|
| 2341199 | 3/1974 | Germany . |
| 2510392 | 9/1976 | Germany . |
| 3205411 | 8/1983 | Germany . |
| 3603016 | 8/1987 | Germany . |
| 4439454 | 5/1996 | Germany . |
| 55-135210 | 10/1980 | Japan . |
| 1399369 | 7/1975 | United Kingdom . |
| 1399370 | 7/1975 | United Kingdom . |

Primary Examiner—F. Daniel Lopez
Attorney, Agent, or Firm—Shook, Hardy & Bacon LLP

[57] ABSTRACT

A hydraulic actuator and a method for degassing hydraulic actuators having at least two chambers are disclosed. For actuating a hydraulic element, for example a piston in a piston-and-cylinder unit the hydraulic actuator may be supplied with pressurized hydraulic fluid from a hydraulic source via gate valves. The chambers may be interconnected via another gate valve such that when the other gate valve is open, a closed flushing circuit may be configured, starting from a hydraulic fluid container via a hydraulic pump, a first gate valve, a first chamber, the additional valve, a second chamber, a second gate valve and back to the hydraulic fluid container.

8 Claims, 7 Drawing Sheets

HYDRAULIC SYSTEM AND A METHOD FOR DEGASSING SAME

FIELD OF THE INVENTION

The present invention relates to the field of hydraulic systems. More specifically, the invention is related to hydraulic systems comprising an actuator for actuating mechanical systems, in particular for actuating a gearshift rod in a motor vehicle transmission.

The invention, further, relates to a method for degassing hydraulic systems of the afore-mentioned kind.

BACKGROUND OF THE INVENTION

It is generally known to use hydraulic systems, for example for configuring actuators for multi-stepped transmissions in motor vehicles. In such semi-automatic transmissions the hydraulic actuator displaces a gearshift rod along a first actuating direction and, further, in a second actuating direction perpendicular to the first actuating direction for engaging four or five or six forward gears plus one reverse gear.

Hydraulic actuators of the afore-mentioned kind are generally equipped with piston-and-cylinder units having chambers for displacing a piston or a diaphragm which, in turn, is used to displace the gearshift rod or other comparable components. A piston-and-cylinder unit may be configured as a double-acting unit in which the piston adjoins two hydraulic pressure chambers. The pressure in these chambers may be set such that the force exerted on the piston from both sides results in a predetermined axial movement of the piston. In many cases pressure is applied from one side of the piston only in order to displace the piston accordingly. However, it is also possible to establish a differential pressure or to configure the surfaces of the piston such that the resultant force exerted on the piston effects the desired axial movement.

In other cases, the piston-and-cylinder unit may be configured as a single-acting unit in which hydraulic pressure is only applied to one side of the piston whereas the opposite side of the piston is biased by a spring.

If hydraulic pressure is applied to a cylinder chamber in piston-and-cylinder units, the piston will be displaced accordingly and the piston displacement may be transmitted to a corresponding displacement of, for example, a piston rod in one of the two above-mentioned directions. It is, therefore, possible to thus configure a system in which a conventional manually operated multi-stepped transmission, after having been provided with such hydraulic actuator, may be converted into a fully-automatic or a semi-automatic transmission.

In hydraulic systems of the kind of interest it is a general problem that due to leaks in the system gas, in particular air, may penetrate into the hydraulic system. Considering that air is compressed in volume as soon as pressure is applied thereon, in contrast to liquids which are non-compressible, one may easily appreciate that the physical properties as well as the performance characteristics of a hydraulic actuator may be severely affected when air or gas find its way into the system.

It is well known in the art to degas hydraulic systems by providing degassing valves. Such degassing valves allow the air or the gas being dispersed in the hydraulic liquid to escape the system because when the degassing valves are opened the hermetic seal between the interior of the hydraulic system and ambient temperature is briefly deactivated.

Prior art degassing valves are generally configured as screw-type valves. For degassing a hydraulic system, the operator will turn the screw-type degassing valve so that the air which is trapped within the system will escape under the action of the hydraulic fluid pressure. When the air has escaped, foam-type hydraulic fluid will exit from the degassing valve. As soon as pure hydraulic fluid becomes visible, the operator will again close the degassing valve and the actuator or the hydraulic system may be considered as de-gassed so that the valve may be closed again.

Degassing valves of conventional design are normally not easily accessible. Generally, for degassing a hydraulic sytsem, two persons are required. One of the persons will operate the hydraulic system for establishing the required hydraulic fluid pressure, whereas the other person will operate the degassing valve.

It is, therefore, an object of the present invention to improve a hydraulic system of the above-mentioned kind so that degassing of the system is facilitated.

More specifically, it is an object underlying the invention to create a method for degassing such hydraulic systems which is simple to execute and may also be used by unskilled persons.

Still more specifically, it is an object underlying the present invention to improve a motor vehicle transmission of the fully-automatic or semi-automatic type based on conventional manually operated multi-stepped transmissions and having a hydraulic actuator so as to obviate any problems connected with the presence of air or gases trapped within the hydraulic actuator of such transmission systems.

SUMMARY OF THE INVENTION

According to the hydraulic system mentioned at the outset, these and other objects are achieved by:

a source of hydraulic fluid;

a hydraulic pump connected to the source;

an actuator having at least a first and a second hydraulic pressure chamber for effecting displacement of a hydraulic element arranged therebetween;

a first conduit for interconnecting the pump with the first chamber;

a second conduit for interconnecting the pump with the second chamber;

a third conduit for interconnecting the first chamber with the second chamber;

a first valve arranged in the first conduit for connecting the first chamber either with the pump or with the source;

a second valve arranged in the second conduit for connecting the second chamber either with the pump or with the source;

a third valve arranged in the third conduit for interconnecting or separating, respectively, the first and the second chambers; and control means for operating the hydraulic system in an operating mode or in a flushing mode, wherein in the operating mode the third valve is closed at any times for separating the first and the second chambers, whereas the first valve and the second valve are operated such as to establish a first and a second predetermined pressure, respectively, within the first and the second chambers thereby effecting displacement of the hydraulic element; and in the flushing mode the third valve is opened for interconnecting the first and the second chambers, whereas the first valve is opened for connecting the first chamber to the pump and the second valve is opened for connecting the second chamber to the source thereby effecting a flushing flow of hydraulic fluid from the source via the pump, the first valve, the first chamber, the third valve, the second chamber, the second valve and back to the source.

The object is, further, achieved by a method for degassing a hydraulic system, as specified at the outset, the system comprising:

a source of hydraulic fluid;

a hydraulic pump connected to the source;

an actuator having at least a first and a second hydraulic pressure chamber for effecting displacement of a hydraulic element arranged therebetween;

a first conduit for interconnecting the pump with the first chamber;

a second conduit for interconnecting the pump with the second chamber;

a third conduit for interconnecting the first chamber with the second chamber;

a first valve arranged in the first conduit for connecting the first chamber either with the pump or with the source;

a second valve arranged in the second conduit for connecting the second chamber either with the pump or with the source;

a third valve arranged in the third conduit for interconnecting or separating, respectively, the first and the second chambers; and control means for operating the hydraulic system in an operating mode or in a degassing mode, wherein in the degassing mode, the third valve is opened for interconnecting the first and the second chambers, whereas said first valve is opened for connecting the first chamber to the pump and the second valve is opened for connecting the second chamber to the source thereby effecting a flushing flow of hydraulic fluid from the source via the pump, the first valve, the first chamber, the third valve, the second chamber, the second valve and back to the source.

Still more specifically, according to the above-mentioned motor vehicle transmission having a gearshift rod for engaging various gears of the transmission, the gearshift rod being displaced by means of a hydraulic actuator system, the object is achieved by:

a source of hydraulic fluid;

a hydraulic pump connected to the source;

an actuator having at least a first and a second hydraulic pressure chamber for effecting displacement of a hydraulic element arranged therebetween;

a first conduit for interconnecting the pump with the first chamber;

a second conduit for interconnecting the pump with the second chamber;

a third conduit for interconnecting the first chamber with the second chamber;

a first valve arranged in the first conduit for connecting the first chamber either with the pump or with the source;

a second valve arranged in the second conduit for connecting the second chamber either with the pump or with the source;

a third valve arranged in the third conduit for interconnecting or separating, respectively, the first and the second chambers; and control means for operating the hydraulic system in an operating mode or in a flushing mode, wherein in the operating mode the third valve is closed at any times for separating the first and the second chambers, whereas the first valve and the second valve are operated such as to establish a first and a second predetermined pressure, respectively, within the first and the second chambers thereby effecting displacement of the hydraulic element; and in the flushing mode the third valve is opened for interconnecting the first and the second chambers, whereas the first valve is opened for connecting the first chamber to the pump and the second valve is opened for connecting the second chamber to the source thereby effecting a flushing flow of hydraulic fluid from the source via the pump, the first valve, the first chamber, the third valve, the second chamber, the second valve and back to the source.

Generally, chambers of hydraulic actuators are not subjected to hydraulic fluid flowing therethrough. By providing a gate-type valve it is possible to interrupt the strict separation between the chambers. For degassing the hydraulic actuator, gas-free hydraulic fluid is pumped from the hydraulic fluid source container through the chambers. The hydraulic fluid loaded with dispersed gas which had been contained within the chambers is thus transported back to the hydraulic fluid container.

For configuring an open degassing circuit of the aforementioned kind it is only necessary to provide conventional hydraulic actuators with a supplemental switchable gate valve. For the remaining degassing procedure one may take advantage of the components which are available anyway, for example the hydraulic fluid source and the gate valves which are used to connect the chambers of the hydraulic actuator with a hydraulic pressure source, for example with the output of a hydraulic pump or with the pressureless hydraulic fluid source container, respectively. This does not require any supplemental mechanical provisions because the valves and pumps as are used in conventional hydraulic actuators are generally controlled electromagnetically.

The degassing may, hence, be executed with high reliability because specific operations like the turning in or turning out of degassing screws which are highly depending on the reliability of the particular person, are no more required. Hence, an entire degassing may be guaranteed at any times. As the user of the suggested system needs not to make mechanical operations, no mechanical damages may occur, for example on mechanical degassing valves. In contrast, the degassing operation may be remotely controlled, for example by initiating an appropriate electronic command sequence in a control system for the hydraulic actuator within a vehicle. Thus, it is not necessary to remove components of the vehicle or to dismantle same.

Finally, when executing the suggested method, no hydraulic fluid may escape the hydraulic circuit during the degassing operation as had been the case with conventional degassing valves. Hence, losses of hydraulic fluid or environmental pollution is entirely prevented. Finally, the user of the suggested system does not come into contact with hydraulic fluid so that he needs not wear protective clothing.

The degassing operation may be effected in a very short period of time by one single person.

According to a preferred embodiment of the invention the third valve is configured as a pressure-controlled gate valve opening when its operating pressure exceeds a predetermined threshold value, the threshold value being higher than the higher one of the first and second predetermined pressures.

These measures have the advantage that it is not necessary to provide a separate electromagnetic control for the third gate valve. Instead, for effecting a degassing operation, the fluid pressure is raised until the gate valve is switched into its open position.

According to another preferred embodiment of the invention the first and the second chambers together with the hydraulic element are configured as a first piston-and-cylinder unit, the hydraulic element being configured as a piston. Preferably, the third valve is integrated into the piston.

In this embodiment no separate conduits are necessary for interconnecting the two chambers. Instead, the two chambers on opposite sides of the piston are interconnected by the valve assembly which is integrated into the piston. It goes without saying that this particular feature has particular advantage when the third valve is a pressure-controlled valve of the afore-mentioned type not necessitating separate electromagnetic control lines for switching same from its closed to its open state and vice versa.

According to another embodiment of the invention, a third hydraulic pressure chamber is provided in a second piston-and-cylinder unit, the third chamber being connected to the pump via a fourth conduit have a fourth valve therein, a fifth conduit being provided for interconecting the first and the third chambers and having a fifth valve therein, thereby enabling two parallel flushing circuits.

According to one more embodiment of the invention a third hydraulic pressure chamber is provided in a second piston-and-cylinder unit, the third chamber being connected to the pump via a fourth conduit having a fourth valve therein, the third valve being configured as a pressure-controlled displacement valve having a control input and opening and closing, respectively, gradually as a function of a control pressure applied to the control input, the control input being connected to the third chamber.

These measures have the advantage that valves of particular simple mechanical design may be used which have a control opening which is closed during normal operation at the operational pressure of the hydraulic fluid. If a higher gating pressure is set, the piston is displaced further so that the control opening is no more covered by the piston.

When the hydraulic actuator has three or more chambers with gate valve associated to any of these and one central chamber is connected with the other chambers via switchable gate valves, parallel flushing circuits may be configured.

It goes without saying that for configuring an open circuit with, for example, three chambers, only two switchable gate valves are necessary. By configuring two parallel flushing circuits, each of the parallel circuits may be designed very short.

The two parallel flushing circuits may be flushed either synchronously or one after the other.

It is particularly preferred to configure the switchable valves as parallel pressure limiting valves having a switching pressure being higher than the operational pressure of the hydraulic fluid for actuating the respective actuator. For degassing the central chamber and one of the other chambers the remaining chambers may be supplied with hydraulic fluid under switching pressure from the central pressure fluid container.

When doing so, a counter-pressure is set within the chambers which shall not be degassed so that it is possible to switch only one pressure limiting valve into its open position by using the corresponding switching pressure. When doing so, identical pressure limiting valves may be used for two flushing circuits. Insofar, it should be borne in mind that due to usual production tolerances and, hence, not identical switching pressures it might be quite difficult to synchronously switch to parallel pressure limiting valves.

As an alternative, it may be preferred if the central chamber is connected with the other chambers via a pressure-controlled displacement valve.

When doing so one single valve is sufficient to effect an alternating or a parallel degassing of various flushing circuits, depending on the position of the control edge within the valve.

The hydraulic actuator according to the present invention is preferably used as a transmission actuator for a multi-stepped transmission in a motor vehicle. Such transmission actuators are quite difficult to degas in conventional manner since they are attached to the transmissions at locations which are almost not accessible. In some cases it is even necessary to remove the entire transmission from the motor vehicle just for degassing the actuator. By means of the hydraulic actuator according to the present invention, the transmission actuator may be degassed in relatively short time and in a very simple and efficient manner without the necessity to physically access the transmission or the actuator, let alone to remove same from the vehicle.

It goes without saying that the advantages and features of the invention explained before and those that will be explained hereinafter, shall not only be understood in the particularly given combination but also in other combinations or alone, without leaving the scope of the present invention.

BRIEF DESCRIPTION OF THE DRAWINGS

Further features and advantages of the invention shall become apparent from the subsequent description of preferred embodiments of the invention which relate to the drawings. In the drawings.

DETAILED DESCRIPTION OF THE PREFERRED EMBODIMENTS

Figure 1A:
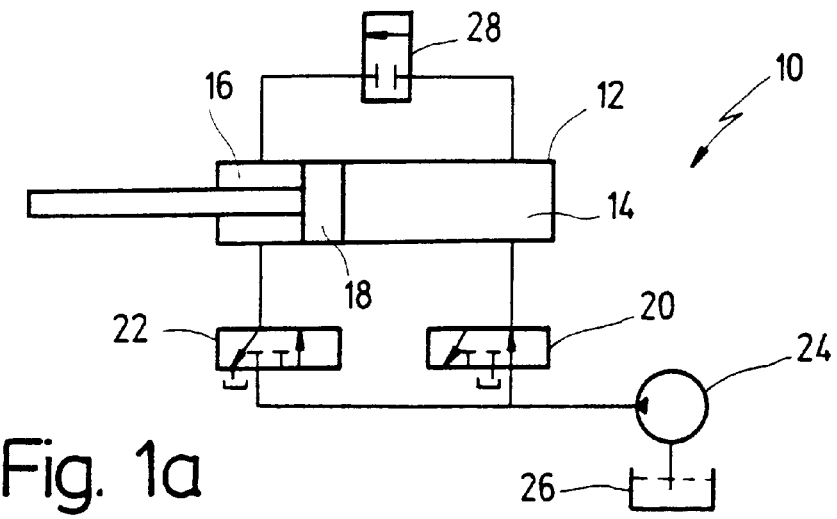
FIG. 1 is a schematic representation of a hydraulic actuator according to the invention, in two different switching positions (FIG. 1a, 1b) and in a degassing position (FIG. 1c)

In FIG. 1 reference numeral 10 generally indicates a first embodiment of a hydraulic actuator according to the invention.

The hydraulic actuator 10 comprises a double-acting piston-and-cylinder unit 12 having a first chamber 14 and a second chamber 16, the chambers 14, 16 being arranged on opposite sides of a piston 18 of piston-and-cylinder unit 12.

Chambers 14, 16 are connected with a pump 24 via a first switching or gate valve 20 and a second gate valve 22, respectively, for supplying chambers 14, 16 from a hydraulic fluid container 26.

Gate valves 20, 22 are configured as displacement valves with two operational positions. In the open position the respective chamber is connected to pump 24, as shown at gate valve 20 in FIG. 1a. In the closed position (gate valve 22 in FIG. 1a) the respective chamber is connected to the hydraulic fluid container 26 such that any hydraulic fluid contained in that particular chamber may freely flow back to hydraulic fluid container 26.

Within hydraulic actuator 10 chambers 14, 16 are connected with each other via a third gate valve 28. Gate valve 28 is also configured as a displacement valve having a closed position and an open position.

Figure 1B:
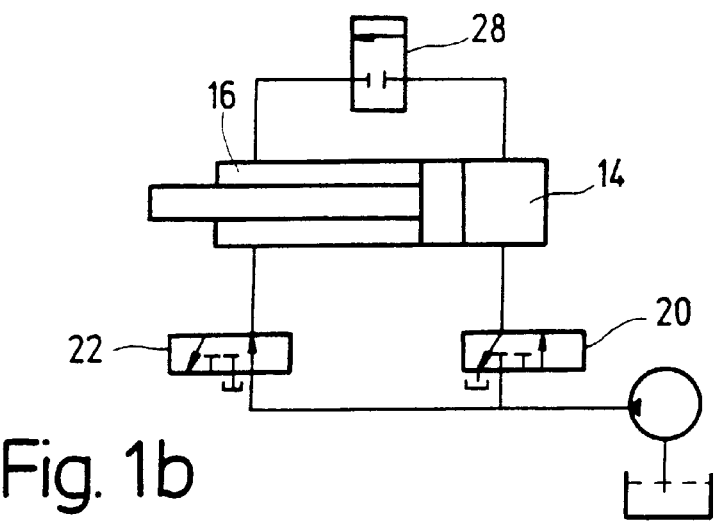
Figure 1C:
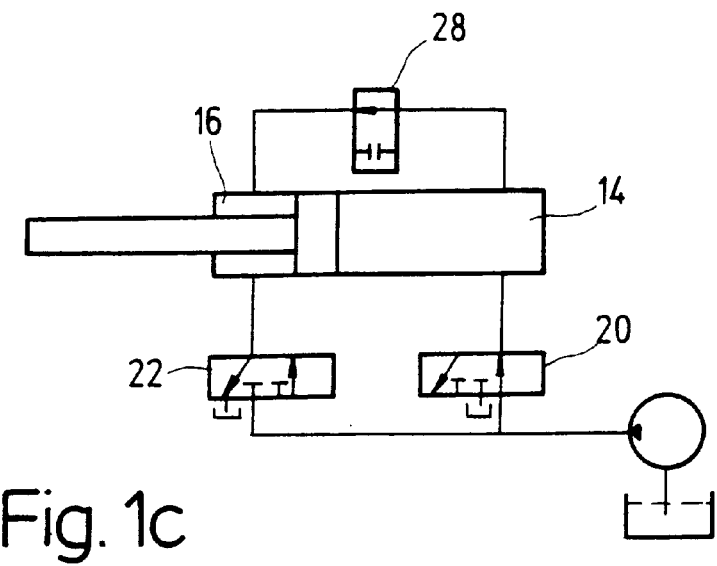

During normal operation of a piston-and-cylinder unit 12, gate valves 20, 22 are switched by means of an electronic control unit for the armatures of gate valves 22 (not shown) such that piston 18 is pushed either to the one side (to the left hand side in FIG. 1a) or to the other side (to the right hand side in FIG. 1b).

For degassing hydraulic actuator 10, third gate valve 28 is switched into its open state and gate valves 20, 22 are switched such that pump 24 flushes hydraulic fluid from hydraulic fluid container 26 through first gate valve 20 into first chamber 14 and from first chamber 14 via third gate valve 28 into second chamber 16 and from second chamber 16 via second gate valve 22 back to hydraulic fluid container 26. By opening third gate valve 28 the strict separation between chambers 14 and 16 which is maintained under normal operational conditions, is interrupted. Any hydraulic fluid that had been contained within chambers 14, 16 and in which gas or air might have been disperched, is thus conveyed back to hydraulic fluid container 26. Cuncurrently, chambers 14, 16 are re-filled with fresh hydraulic fluid from hydraulic fluid container 26. Of course, when doing so one has to avoid that air that has been collected within hydraulic fluid container 26 is sucked in by pump 24.

It goes without saying that the flushing circuit described before with respect to FIG. 1c may as well be operated in the reverse direction by switching gate valves 20, 22 into their respective other positions.

Figures 2, 2A:
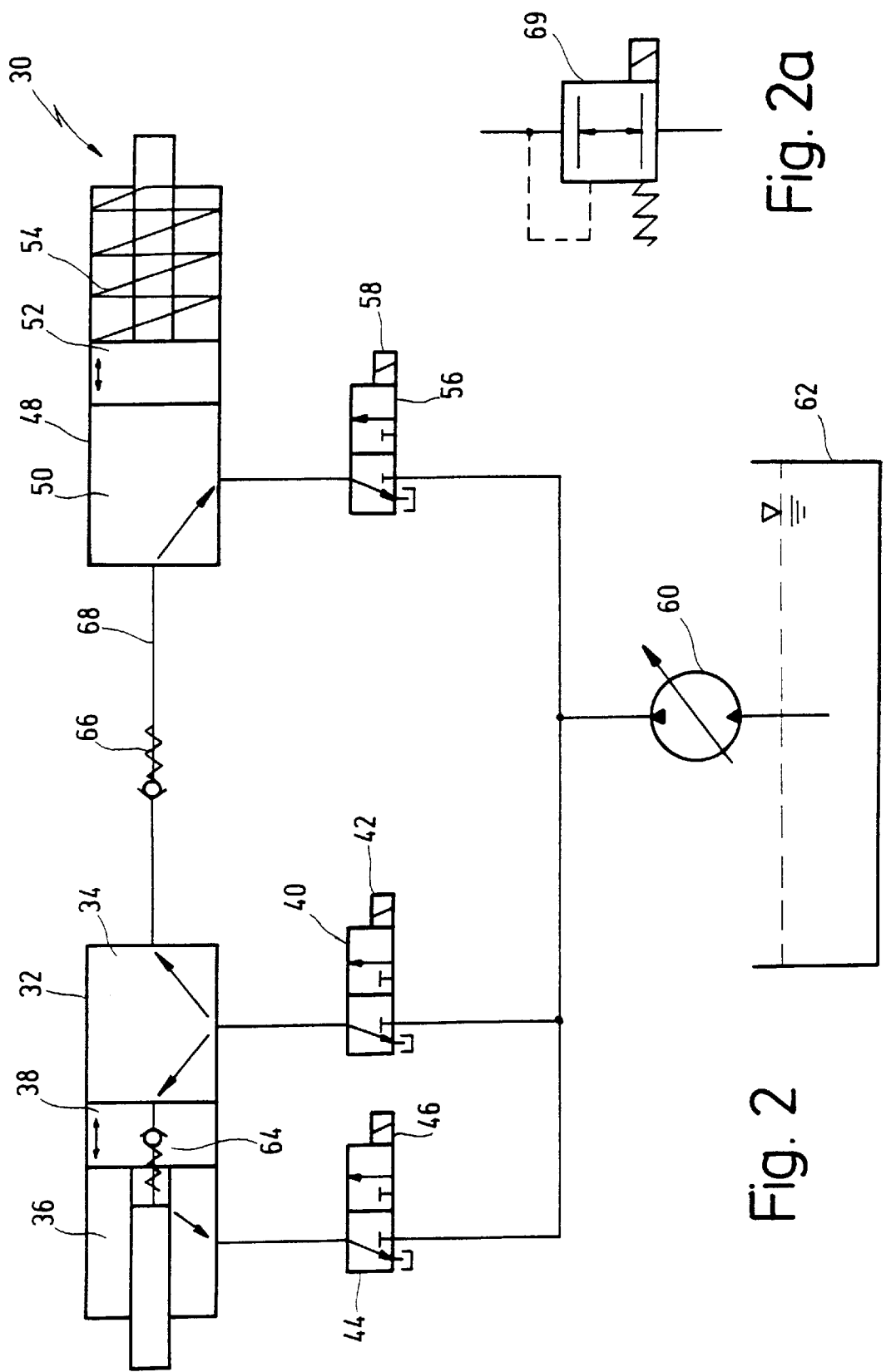
FIG. 2 and 2a is a second embodiment of a hydraulic actuator utilizing a double-acting piston-and-cylinder unit and a single-acting piston-and-cylinder unit.

FIG. 2 shows a second embodiment of a hydraulic actuator according to the present invention, and generally designated by reference numeral 30.

Hydraulic actuator 30 is provided with a double-acting piston-and-cylinder unit 32 having a first chamber 34 and second chamber 36 arranged on opposite side of a piston 38.

First chamber 34 is associated to a first gate valve 40 being biased by a spring and having an armature 42 for controlling same. Second chamber 36, in turn, is associated to a second, spring-biased gate valve 44 having an armature 46 for controlling same.

Hydraulic actuator 30, further, comprises a single-acting piston-and-cylinder unit 48 having a third chamber 50 on one side of a piston 52. The piston 52 is biased by a spring 54. Third chamber 50 is associated to a third, spring-biased gate valve 56 having an armature 58 for controlling same.

The operation of gate valves 40, 44, 56 corresponds to the operation of gate valves 20, 22 of the first embodiment of FIG. 1.

The three gate valves 40, 44, 56 are connected to a hydraulic fluid container 62 via a pump 60. The displacement volume of pump 60 may be adjusted individually, for enabling to switch between an operational pressure and a switching pressure.

A first gate valve 64 being configured as a pressure-operated valve is integrated into piston 38 of double-acting piston-and-cylinder unit 32. First gate valve 64 interconnects the two chambers 34 and 36. A second gate valve 66, also configured as a pressure-operated valve, interconnects first chamber 34 with third chamber 50 via a conduit 68.

The pressure-operated gate valves 64, 66 are stop valves and are actuated in parallel. Therefore, when the system is set to switch pressure, hydraulic fluid may flow from first chamber 34 into second chamber 36 and from first chamber 34 to third chamber 50, but not in an opposite direction.

For degassing first chamber 34 and second chamber 36 a switching pressure is set within first chamber 34 and third chamber 50, the switching pressure exceeding the nominal operational pressure of hydraulic actuator 30, for actuating pressure-operated valves 64, 66. This is done by connecting chambers 34 and 50 with pump 60 via gate valves 40, 56. Concurrently, second gate valve 44 is switched such that second chamber 36 is connected with hydraulic fluid container 62. Due to the elevated switching pressure, pressure-operated valve 64 opens so that the two chambers 34 and 36 are flushed and, hence, degassed. As the pressure prevailing in chambers 34 and 50 is equal, pressure-operated valve 66 does not open.

For degassing first chamber 34 and third chamber 50, first chamber 34 and second chamber 36 are connected to pump 60 via gate valves 40 and 44, whereas third gate valve 56 is switched such that third chamber 50 is connected to hydraulic fluid container 62. Accordingly, second pressure-operated valve 66 opens while first pressure-controlled valve 64 remains closed.

By establishing a counter pressure into the chamber which is not to be degassed, an individual degassing is made possible.

FIG. 2a shows a switchable pressure regulating valve 69 which may be used in the embodiment of FIG. 2 in lieu of gate valve 40. The switchable pressure-controlled valve 69 may control the hydraulic pressure between two predetermined values or switch therebetween, for example between the nominal operational pressure and the elevated switching pressure. Hence, when using pressure-controlled valve 69 ist is not necessary to adjust the output power of pump 60.

Figure 3:
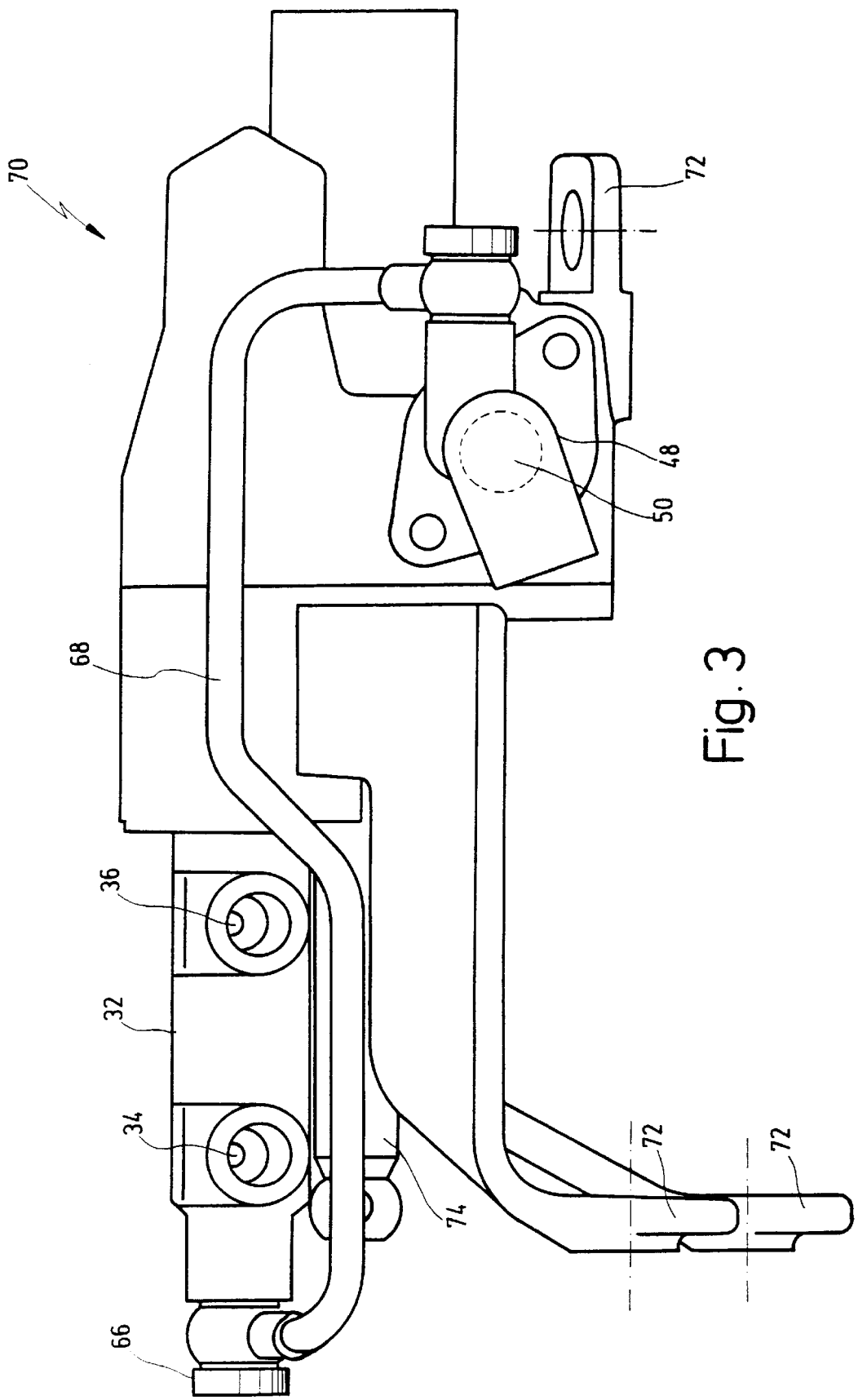
FIG. 3 is a side-elevational view of a transmission actuator equipped with the hydraulic actuator of FIG. 2.

FIG. 3 shows an actuator 70 for a transmission and being equipped with the hydraulic actuator 30 of FIG. 2.

Transmission actuator 70 is attached to a transmission (not shown) by means of flanges 72. A shift rod 74 extends from transmission actuator 70 and may be connected to the shift rod of the transmission.

The double-acting piston-and-cylinder unit 32 is directed parallel to shift rod 74 and is coupled with the latter by means of interconnecting means not shown. By switching gate valve 40, 44 (not shown in FIG. 3) the two chambers 34 and 36 of piston-and-cylinder unit 32 may individually be connected to the pump in order to translate shift rod 74 axially in two opposite directions.

The single-acting piston-and-cylinder unit 48 is arranged radially to shift rod 74 and allows to rotate shift rod 74 with the help of interconnection means (not shown).

Through the combination of rotational and axial movement of shift rod 74 the various gears of the transmission may be engaged by means of transmission actuator 70.

Double-acting piston-and-cylinder unit 32 and single-acting piston-and-cylinder unit 48 are interconnected via conduit 68 having second pressure-operated valve 66 incorporated therein.

Figure 4:
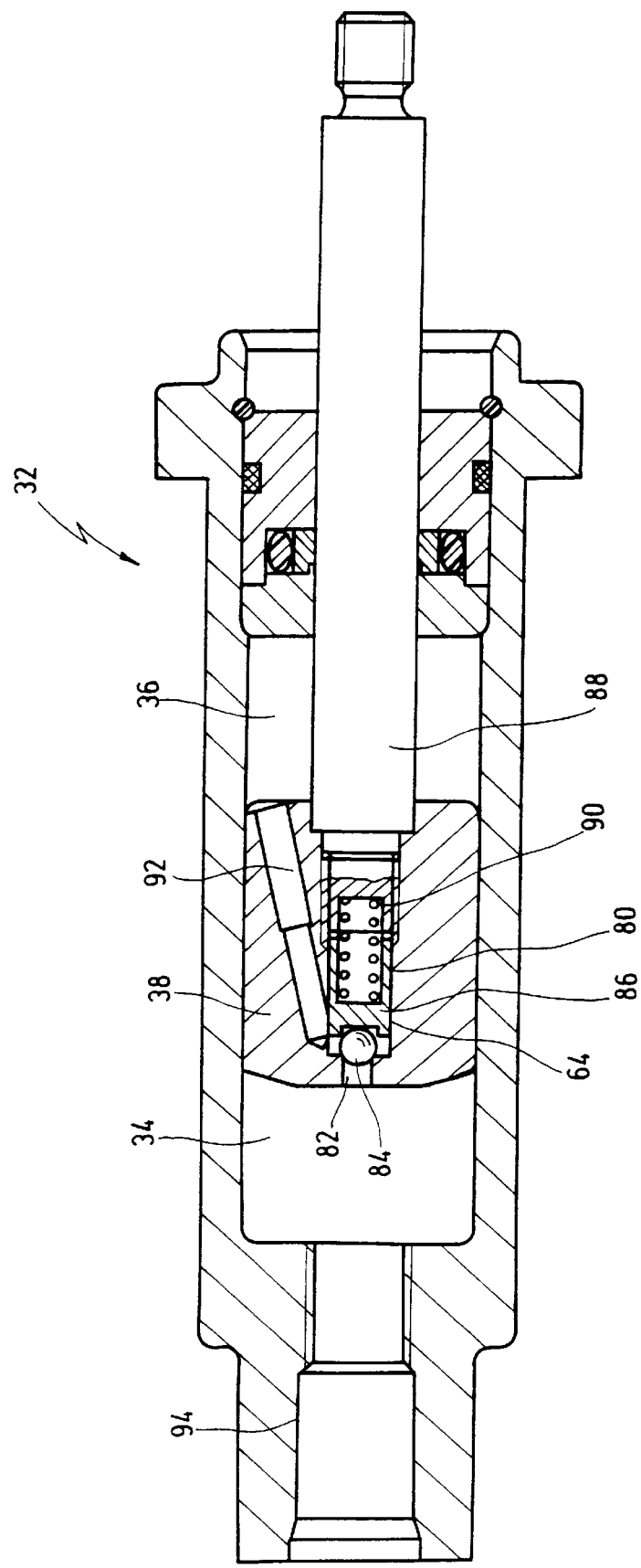
FIG. 4 is an axial cross-sectional view of a double-acting piston-and-cylinder unit of the transmission actuator of FIG. 3.

FIG. 4 shows an axial cross-sectional view of double-acting piston-and-cylinder unit 32.

Piston 38 is provided with an axial bore 80 exhibiting a port 82 opening into first chamber 34. A ball 84 is seated within axial bore 80 between port 82 and a valve member 86 which is axially displaceable within bore 80. A spring is provided between valve member 86 and a piston rod 88 screwed into the end of bore 80 opposite port 82. Spring 90 causes ball 84 to close port 82 with a predetermined force corresponding to the switching pressure. Second chamber 36 is connected to the cavity surrounding ball 84 via a bore 92 so that the two chambers 34 and 36 are connected with each other when ball 84 is lifted off port 82. This arrangement constitutes first pressure-operated valve 64.

Figure 5:
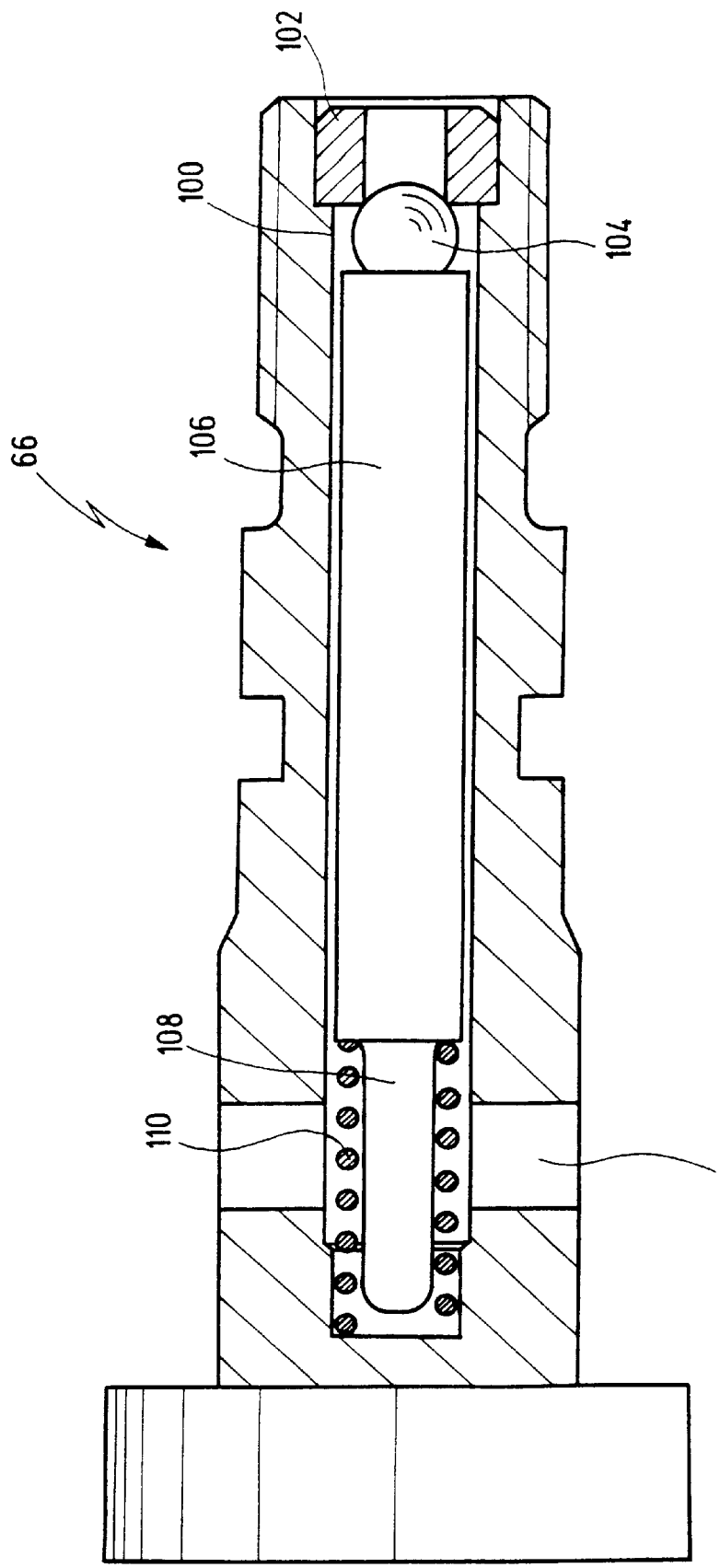
FIG. 5 is an axial cross-sectional view of a pressure valve of the transmission actuator of FIG. 3.

Piston-and-cylinder unit 32 is, further, provided with a connecting port 94 which may interconnect first chamber 34 with conduit 68. Second pressure-operated valve 66 may be screwed into connecting port 94 depicted with its longitudinal cross-sectional view in FIG. 5.

Second pressure-operated valve 66 generally has the shape of a bolt and is provided with an axial bore 100, one terminal end of which being closed by means of a terminal tubular member 102. A ball 104 is seated within axial bore 100 between terminal tubular member 102 and a valve member 106 which, in turn, is journalled within axial bore 100 to be displaced in an axial direction. A spring 110 is fastened between a pin-shaped terminal end 018 of valve member 106 and the bottom of axial bore 100. Spring 110 presses ball 104 against the tubular opening of terminal tubular member 102.

As soon as ball 104 is lifted off terminal tubular member 102, hydraulic fluid flows passed valve member 106 to a radial bore 112 which is adapted to be connected to conduit 68 by means of a sleeve.

The pressure-operated valves generally open when a pressure threshold (operating pressure) is exceeded. The pressure-operated valves need not be subjected to additional adjustment procedures. For determining the switching pressure, all of the influences of springs 90, 110 and of the remaining mechanical components have to be taken into account. Due to variations within the manufacturing process different pressure-operated valves exhibit different switching pressure values. Therefore, a safe opening of the pressure-operated valves may only be guaranteed at a hydraustatic differential pressure exceeding the rated maximum switching pressure as determined by the manufacturing process.

Figure 6:
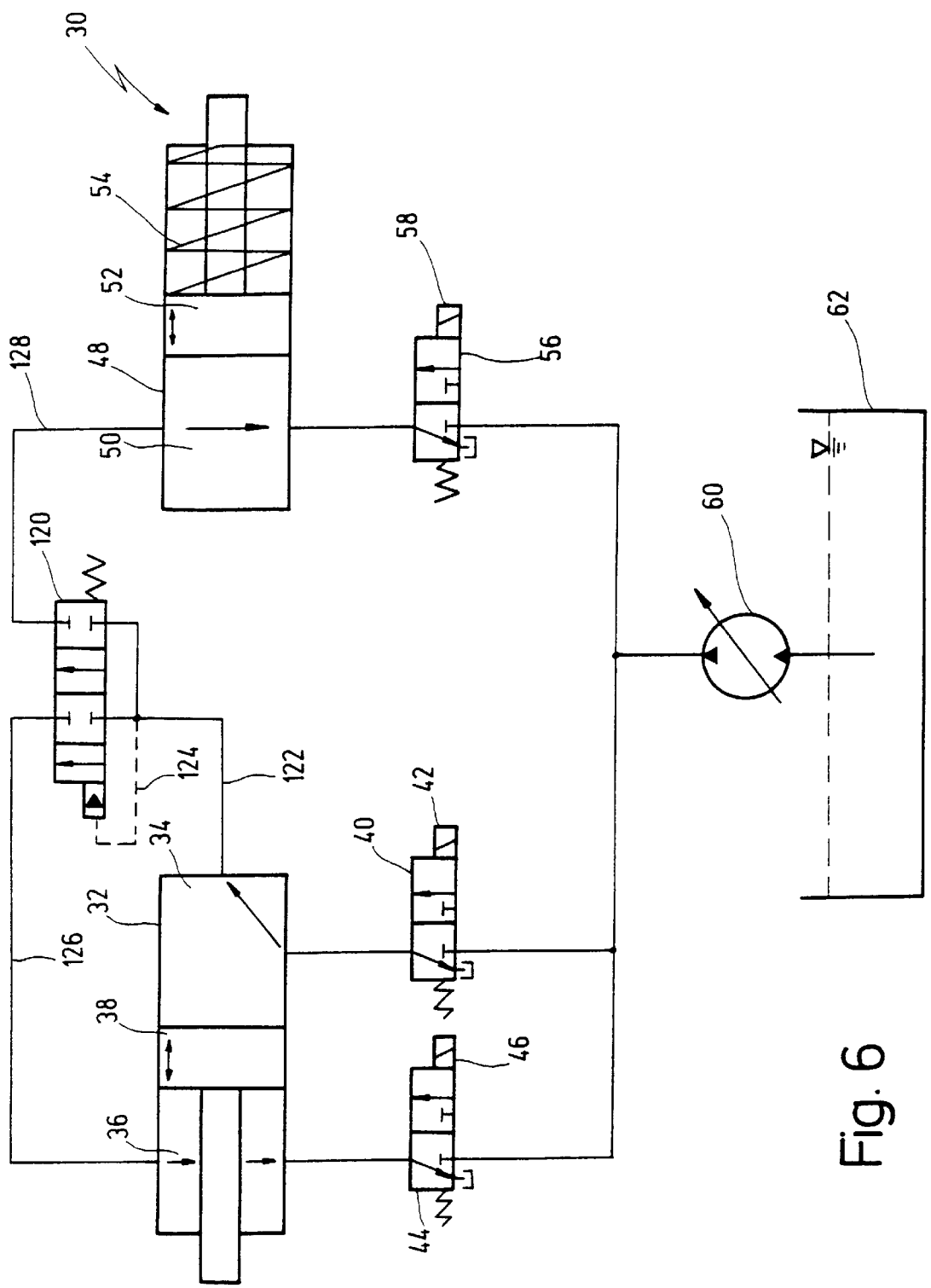
FIG. 6 shows a third embodiment of a hydraulic actuator.
Figure 7:
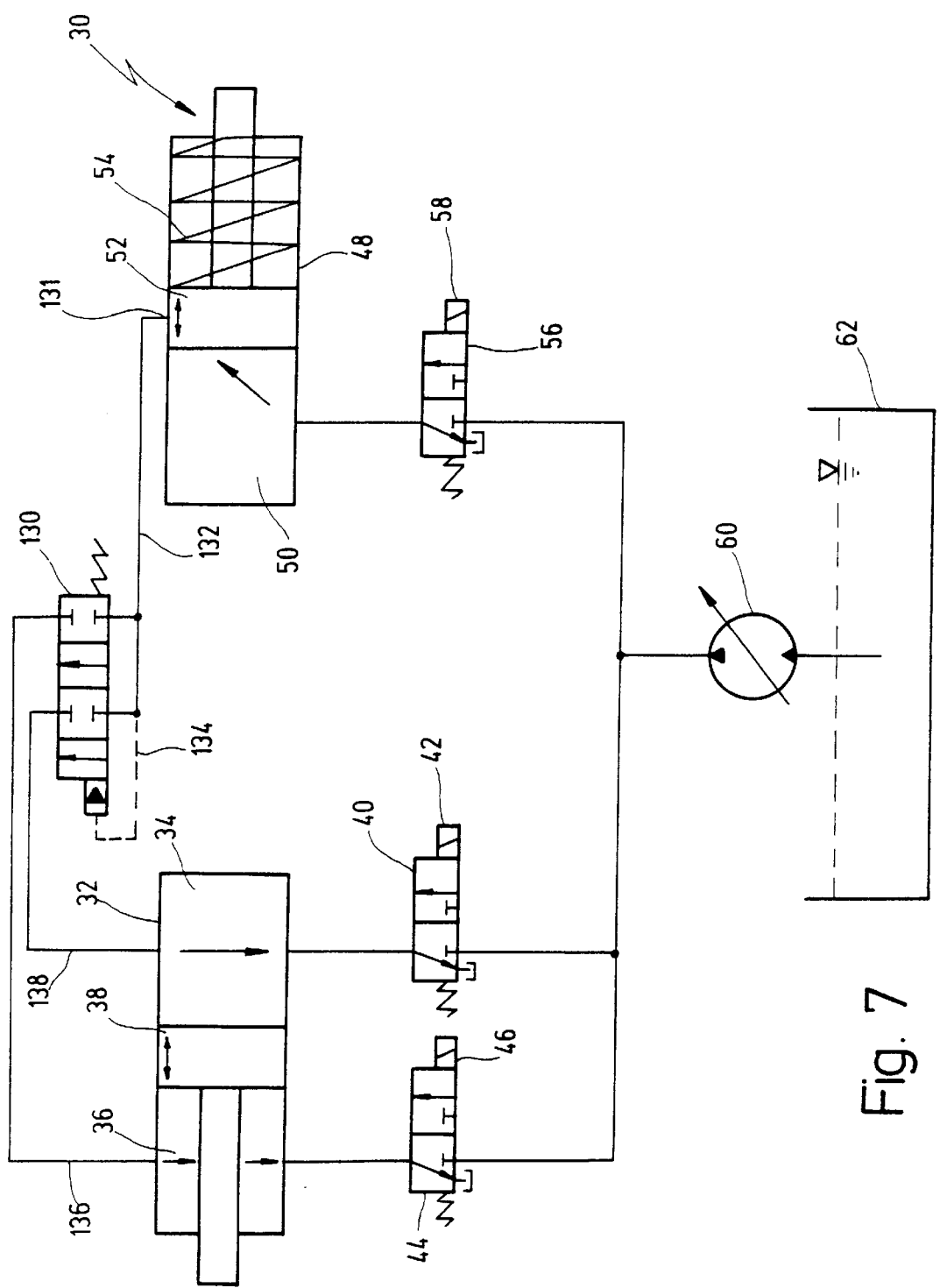
FIG. 7 shows a fourth embodiment of a hydraulic actuator.

FIGS. 6 and 7 show a third and a fourth embodiment, respectively, of a hydraulic actuator according to the invention, the principal structure of which being similar to that of the embodiment of FIG. 2. Therefore it is also generally designated with reference numeral 30.

The third embodiment shown in FIG. 6 distinguishes from the second embodiment shown in FIG. 2 in that two pressure-controlled 4/4-displacement valves 120 together with their associated circuitry are utilized instead of the two pressure-operated valves 64, 66 acting as stop valves. The two inputs of displacement valve 120 are connected with first chamber 32 via a conduit 122. Conduit 122 branches into a control conduit 124 for a pressure-controlled actuation of displacement valve 120 against the action of a spring. The two outputs of displacement valve 120 are connected to second chamber 36 and third chamber 50, respectively, via conduits 126 and 128, respectively. If pressure is set at the operational pressure level of the hydraulic fluid for actuating actuators 38, 52, displacement valve 120 is in its rest position due to the spring bias. However, as soon as switching pressure is set, conduit 122 is connected to parallel conduits 126 and 128, such that all three chambers 34, 36 and 50 may be flushed in parallel.

The fourth embodiment of FIG. 7 also shows a pressure-controlled 4/4-displacement valve 130 being identical with the displacement valve 120 of the third embodiment.

In the fourth embodiment a single-acting piston-and-cylinder unit 48 has a control opening 131 within the overlying range between piston 52 and the cylinder. When operational pressure is set, control opening 131 is closed. As soon as switching pressure is set, piston 52 is displaced against the action of spring 54 until control opening 131 is free, thus communicating chamber 50 with a conduit 132 being connected to the two inputs of displacement valve 130. Like in the case of the third embodiment a control conduit 134 branches from conduit 132 for the pressure-controlled actuation of displacement valve 130. The outputs of displacement valve 130 are connected to chambers 32 and 36, respectively, via conduits 136 and 138, respectively.

By serially interconnecting control opening 131 and displacement valve 130 an increased safety is obtained with respect to inadverdent opening of the flushing circuit, for example due to spurious pressure peaks within the operational pressure.

It goes without saying that also in the third and the fourth embodiment a switchable pressure-controlled valve 69 as shown in FIG. 2a may be utilized in lieu of pressure-operated valve 40. In that case a pump having a constant volume of displacement may be used in lieu of adjustable pump 60.

We claim:

1. A hydraulic system comprising:

a source of hydraulic fluid;

a hydraulic pump connected to said source;

actuator means having at least a first and a second hydraulic pressure chamber for effecting displacement of a hydraulic element arranged therebetween;

first conduit means for interconnecting said pump with said first chamber;

second conduit means for interconnecting said pump with said second chamber;

third conduit means for interconnecting said first chamber with said second chamber;

first valve means arranged in said first conduit means for connecting said first chamber either with said pump or with said source;

second valve means arranged in said second conduit means for connecting said second chamber either with said pump or with said source;

third valve means arranged in said third conduit means for interconnecting or separating, respectively, said first and said second chambers; and control means for operating said hydraulic system in an operating mode or in a flushing mode, wherein
in said operating mode said third valve means is closed at any times for separating said first and said second chambers, whereas said first valve means and said second valve means are operated such as to establish a first and a second predetermined pressure, respectively, within said first and said second chambers thereby effecting displacement of said hydraulic element; and
in said flushing mode said third valve means is opened for interconnecting said first and said second chambers, whereas said first valve means is opened for connecting said first chamber to said pump and said second valve means is opened for connecting said second chamber to said source thereby effecting a flushing flow of hydraulic fluid from said source via said pump, said first valve means, said first chamber, said third valve means, said second chamber, said second valve means and back to said source;

wherein said third valve means is configured as a pressure-controlled gate valve opening when its operating pressure exceeds a predetermined threshold value, said threshold value being higher than the higher one of said first or second predetermined pressures.

2. The system of claim 1 wherein said first and said second chambers together with said hydraulic element are configured as a first piston-and-cylinder unit, said hydraulic element being configured as a piston.

3. The system of claim 2 wherein said third valve means is arranged within said piston.

4. The system of claim 2 wherein a third hydraulic pressure chamber is provided in a second piston-and-cylinder unit, said third chamber being connected to said pump via fourth conduit means having fourth valve means therein, fifth conduit means being provided for interconnecting said first and said third chambers and having fifth valve means therein, thereby enabling two parallel flushing circuits.

5. The system of claim 1 wherein a third hydraulic pressure chamber is provided in a second piston-and-cylinder unit, said third chamber being connected to said pump via fourth conduit means having fourth valve means therein, said third valve means being configured as a pressure-controlled displacement valve having a control input and opening and closing, respectively, gradually as a function of a control pressure applied to said control input, said control input being connected to said third chamber.

6. The system of claim 5 wherein said control input is connected to an opening in a peripheral wall of said third chamber, said second piston being adapted to run over said opening when said fourth valve means is opened.

7. A method for degassing a hydraulic system, said system comprising:

a source of hydraulic fluid;

a hydraulic pump connected to said source;

actuator means having at least a first and a second hydraulic pressure chamber for, effecting displacement of a hydraulic element arranged therebetween;

first conduit means for interconnecting said pump with said first chamber;

second conduit means for interconnecting said pump with said second chamber;

third conduit means for interconnecting said first chamber with said second chamber;

first valve means arranged in said first conduit means for connecting said first chamber either with said pump or with said source;

second valve means arranged in said second conduit means for connecting said second chamber either with said pump or with said source;

third valve means arranged in said third conduit means for interconnecting or separating, respectively, said first and said second chambers; and control means for operating said hydraulic system in an operating mode or in a flushing mode, wherein in said operating mode said third valve means is closed at any times for separating said first and said second chambers, whereas said first valve means and said second valve means are operated such as to establish a first and a second predetermined pressure, respectively, within said first and said second chambers thereby affecting displacement of said hydraulic element; and in said flushing mode said third valve means is opened for interconnecting said first and said second chambers, whereas said first valve means is opened for connecting said first chamber to said pump and said second valve means is opened for connecting said second chamber to said source thereby effecting a flushing flow of hydraulic fluid from said source via said pump, said first valve means, said first chamber, said third valve means, said second chamber, said second valve means and back to said source;

wherein said third valve means is configured as a pressure-controlled gate valve opening when its operating pressure exceeds a predetermined threshold value, said threshold value being higher than the higher one of said first or second predetermined pressures.

8. A motor vehicle transmission having a gearshift rod for engaging various gears of said transmission, said gearshift rod being displaced by means of a hydraulic actuator system, said system comprising:

a source of hydraulic fluid;

a hydraulic pump connected to said source;

actuator means having at least a first and a second hydraulic pressure chamber for effecting displacement of a hydraulic element arranged therebetween;

first conduit means for interconnecting said pump with said first chamber;

second conduit means for interconnecting said pump with said second chamber;

third conduit means for interconnecting said first chamber with said second chamber;

first valve means arranged in said first conduit means for connecting said first chamber either with said pump or with said source;

second valve means arranged in said second conduit means tor connecting said second chamber either with said pump or with said source;

third valve means arranged in said third conduit means for interconnecting or separating, respectively, said first and said second chambers; and control means for operating said hydraulic system in an operating mode or in a flushing mode, wherein in said operating mode said third valve means is closed at any times for separating said first and said second chambers, whereas said first valve means and said second valve means are operated such as to establish a first and a second predetermined pressure, respectively, within said first and said second chambers thereby effecting displacement of said hydraulic element; and in said flushing mide said third valve means is opened for interconnecting said first and said second chambers, whereas said first valve means is opened for connecting said first chamber to said pump and said second valve means is opened for connecting said second chamber to said source thereby effecting a flushing flow of hydraulic fluid from said source via said pump, said first valve means, said first chamber, said third valve means, said second chamber, said second valve means and back to said source;

wherein said third valve means is configured as a pressure-controlled gate valve opening when its operating pressure exceeds a predetermined threshold value, said threshold value being higher than the higher one of said first or second predetermined pressures.

* * * * *

UNITED STATES PATENT AND TRADEMARK OFFICE
CERTIFICATE OF CORRECTION

PATENT NO. : 6,079,206
DATED : June 27, 2000
INVENTOR(S) : Gunther Petrzik, Hartmut Hohensee, Martin Seufert It is certified that error appears in the above-indentified patent and that said Letters Patent is hereby corrected as shown below:

column 12, line 50, the word "mode" was incorrectly spelled as "mide."

Signed and Sealed this

Tenth Day of April, 2001

Attest:

NICHOLAS P. GODICI

Attesting Officer    Acting Director of the United States Patent and Trademark Office

UNITED STATES PATENT AND TRADEMARK OFFICE
CERTIFICATE OF CORRECTION

PATENT NO.    : 6,079,206
DATED         : June 27, 2000
INVENTOR(S)   : Gunther Petrzik, Hartmut Hohensee, Martin Seufert It is certified that error appears in the above-identified patent and that said Letters Patent is hereby corrected as shown below:

Item [73] Assignees: Getrag Getriebe-und Zahnradfabrik Hermann Hagenmeyer GmbH & Cie, Ludwigsburg, Germany; and Bayerische Motoren Werke AG, Munich, Germany Signed and Sealed this Eighteenth Day of September, 2001

*Attest:*

*Attesting Officer*

NICHOLAS P. GODICI
*Acting Director of the United States Patent and Trademark Office*